United States Patent [19]
Beck et al.

[11] Patent Number: 5,626,403
[45] Date of Patent: May 6, 1997

[54] BRAKE PRESSURE REGULATOR

[75] Inventors: Erhard Beck, Weilburg; Georg Sonnenschein, Eschborn, both of Germany

[73] Assignee: ITT Automotive Europe GmbH, Germany

[21] Appl. No.: 436,335

[22] PCT Filed: Nov. 22, 1993

[86] PCT No.: PCT/EP93/03267

§ 371 Date: May 22, 1995

§ 102(e) Date: May 22, 1995

[87] PCT Pub. No.: WO94/12376

PCT Pub. Date: Jun. 9, 1994

[30] Foreign Application Priority Data

Nov. 21, 1992 [DE] Germany ............... 42 39 178.4

[51] Int. Cl.⁶ ............... B60T 8/32; B60K 28/16; F15B 9/12; G05D 13/00

[52] U.S. Cl. ............... 303/117.1; 303/115.4; 137/505.25; 137/599

[58] Field of Search ............... 303/113.1, 113.2, 303/115.1, 115.4, 116.1, 116.2, 117.1, DIG. 1, DIG. 2, 115.5, 84.1, 84.2; 137/505.25, 855, 599; 251/324

[56] References Cited

U.S. PATENT DOCUMENTS

| | | | |
|---|---|---|---|
| 3,283,504 | 11/1966 | Stelzer | 137/505.25 X |
| 3,370,166 | 2/1968 | DaRold et al. | |
| 3,918,768 | 11/1975 | Farr | 303/115.4 |
| 4,846,535 | 7/1989 | Kuwana et al. | 303/117.1 |
| 5,290,098 | 3/1994 | Burgdorf et al. | 303/113.2 X |

FOREIGN PATENT DOCUMENTS

| | | |
|---|---|---|
| 0171901 | 2/1986 | European Pat. Off. |
| 2812390 | 10/1978 | Germany. |
| 3006137 | 8/1981 | Germany. |
| 3813138 | 11/1989 | Germany. |
| 278310 | 5/1990 | Germany. |
| 3929009 | 3/1991 | Germany. |
| 4108028 | 9/1992 | Germany. |
| 4106790 | 9/1992 | Germany. |
| 61-6055 | 1/1986 | Japan. |
| 63-78856 | 4/1988 | Japan. |
| WO8001783 | 9/1980 | WIPO. |
| WO9006873 | 6/1990 | WIPO. |
| WO9205991 | 4/1992 | WIPO. |

OTHER PUBLICATIONS

International Search Report for Application PCT/EP93/03267 filed Nov. 22, 1993.

Search Report from the German Patent Office for Application P4239178.4.

*Primary Examiner*—Josie Ballato
*Attorney, Agent, or Firm*—Thomas N. Twomey; J. Gordon Lewis

[57] ABSTRACT

A brake pressure regulator comprising a hydraulically actuable slide valve integrated in a receiving bore within the valve accommodating body. The slide valve, in response to the switching position of the electromagnetic valves, controls the pressure fluid volume between a pressure fluid source and a pressure fluid consumer. The pressure regulator includes pressure fluid channels terminating on both front faces of the slide valve which are hydraulically connected through an inlet valve to the pressure fluid consumer. Preferably the slide valve includes a circular groove provided with a control edge and interconnecting the pressure fluid source and the inlet valve through a feed-in channel. The invention employs the principle of preventing leakage flows from occurring by suitably arranging pressure fluid channels and sealing elements and by pointedly guiding the pressure fluid flow.

10 Claims, 4 Drawing Sheets

BRAKE PRESSURE REGULATOR

TECHNICAL FIELD

The present invention relates to brake pressure regulators and more particularly relates to brake pressure regulators comprising an anti-locking control and/or a traction slip control.

BACKGROUND OF THE INVENTION

DE 41 08 028 A1 already reveals a brake pressure control comprising a hydraulically actuable slide valve integrated into the valve accommodating body to absorb the valve switching noises during the electromagnetic actuation of the inlet and outlet valves. For this purpose, the slide valve is provided with a blind bore arranged within a annular groove on the slide valve which is operative within a pressure fluid area connecting the pressure fluid source to the inlet valve. The webs of the annular groove form the control edges confining the volume flow as soon as the slide valve leaves the basic position determined by a compression spring. Finally, another annular groove provided on the slide valve establishes the connection to the inlet valve hydraulically opened in the basic position.

It has been found that during the hydraulic actuation of the slide valve leakage flows cannot be prevented from occurring on the metallically sealed area of the cylindrical face, that are likely to result in an undesired pressure increase ahead of the inlet valve as long as the same is closed. Accordingly, during opening of the inlet valve, a substantial pressure prevails exerting an unfavorable effect on the noise pattern.

JP-A-61-6055 discloses a brake pressure control comprising a slide valve provided in the pressure fluid connection between a brake pressure generator and an inlet valve controlling the brake pressure toward the wheel brake. On both front faces of the slide valve, the wheel brake pressure determined by the brake pressure generator prevails in the open switching position of the inlet valve. In a non-locking brake pressure control phase in which the inlet valve separates the pressure fluid connection between the brake pressure generator and the wheel brake (and in which the outlet valve coupled to the inlet valve causes a pressure decrease by opening a pressure fluid connection to a pressure fluid accumulator), a pressure different develops at both front sides of the slide valve which moves the slide valve in its locking position, thereby separating the brake pressure generator from the hydraulic system coupled thereto.

The locking position of the slide valve is caused by a conical ceiling seat on the slide valve. Leakage from the metallically sealed conical sealing face cannot be prevented from occurring. The leakage flow is likely to result in an undesired pressure increase ahead of the closed inlet valve.

A slide valve for a brake pressure control exclusively comprising a metallic ceiling of the cylindrical surface thereof within its housing, its taught by JP-A-63-78856. Between the two front faces of the slide valve, the shaft is provided with a circular grove which with the control edge thereof determines the pressure fluid intake from the brake pressure generator to the wheel brake. One of the front faces is exposed to the pressure of the brake pressure generator whereas the other front face in response to the hydraulically actuated position of the inlet valve is exposed to either the pressure of the brake pressure generator or to the controlled pressure within the wheel brake. The slide valve separates the brake pressure generator from the connect wheel brake as soon as the pressure within the wheel brake is decreased in a non-locking control. This separation takes place because the pressure proportional to the pedal force (which prevails on the opposite front side of the slide valve) produces a pressure difference which is operative to actuate the slide valve. Due to the exclusive metallic ceiling of the slide valve in the housing, leakage from the metallically sealed cylindrical surface cannot be prevented. Such leakage is likely to result in an undesired build-up of pressure fluid in the direction of the hydraulically actuated inlet valve during the non-locking control thereof.

Both JP-A-63-78856 and JP-A-61-6055 disclose hydraulically actuated separating valves which during a non-locking actuation of the brake remain in a deenergized condition in their basic position. No control of the pressure fluid volume supplied by the brake pressure generator to the wheel brake is provided.

It is therefore an object of the invention to overcome the afore-mentioned disadvantages by performing as few structural changes in the brake pressure control as possible thereby efficiently reducing, and all operating conditions, the valve switching noises.

This invention accomplishes these objectives by employing the principle of preventing leakage by suitably arranging pressure fluid channels and sealing elements and by specifically guiding the flow of pressure fluid.

DETAILED DESCRIPTION OF THE PREFERRED EMBODIMENTS

Figure 1:
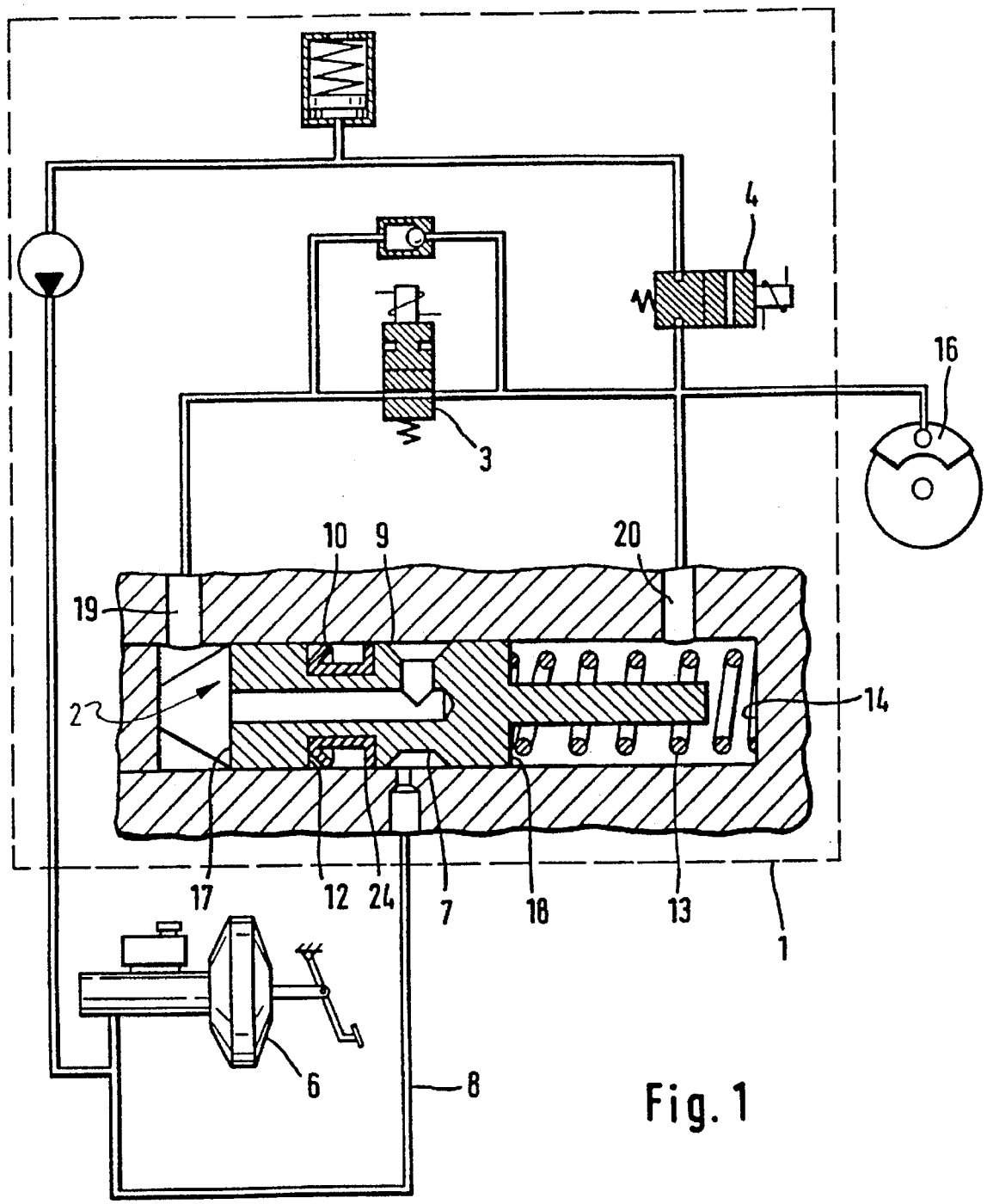
FIG. 1 Schematically shows, in longitudinal section, the slide valve including the required pressure fluid connections to the operational elements of a brake pressure control.

Referring to the drawings, FIG. 1 shows the piston-type slide valve 2 with a circular groove 12 arranged to the left of the circular groove 7. Valve 2 connects the pressure fluid source 6 to the inlet valve 3. Circular groove 12 is provided with a gasket 10 designed to block a leakage flow from the pressure fluid source 6 to the inlet valve 3 but to release a hydraulic connection between the inlet valve 3 and the pressure fluid source 6. For the sake of a better understanding, FIG. 1 only schematically shows the channel guidance for operating a slip-controlled wheel brake, thereby electromagnetically actuating the inlet and outlet valves 3,4 required for the slip control in response to the pressure holding, decreasing and increasing phases. The pressure fluid volume discharged by the outlet valve 4, in a generally known way, is passed through an intermediate accumulator, to a pump redelivering the pressure fluid to the wheel brake circuit.

Operation:

As soon as the pressure prevailing on the lefthand front face 17 of the slide valve 2 exceeds the pressure of the pressure fluid consumer 16 acting on the right-hand front face 18 (inlet valve 3 is closed, outlet valve 4 is open), the slide valve 2 moves against the urging of the compression spring 13 to the right until the first sealing edge 24 of the gasket 10 overlaps with the feed channel 8 connected to the pressure fluid source 6. As the volume flow from the pressure fluid source 6 is thereby blocked, the slide valve 2 remains in an intermediate position thereby limiting, as a result of the effect of the separating valve, the pressure prevailing before the inlet 3. The second sealing edge of the gasket 10 acting as a check valve will insure a pressure relief of the pressure fluid consumption (wheel brake 16) through the check valve connected in parallel to the inlet valve 3 as soon as the pressure level of the pressure fluid source (master cylinder) 6 is decreased. The slide valve 2 as a result of the effect of the compression spring 13 again reaches the basic position as shown to the left.

Figure 2:
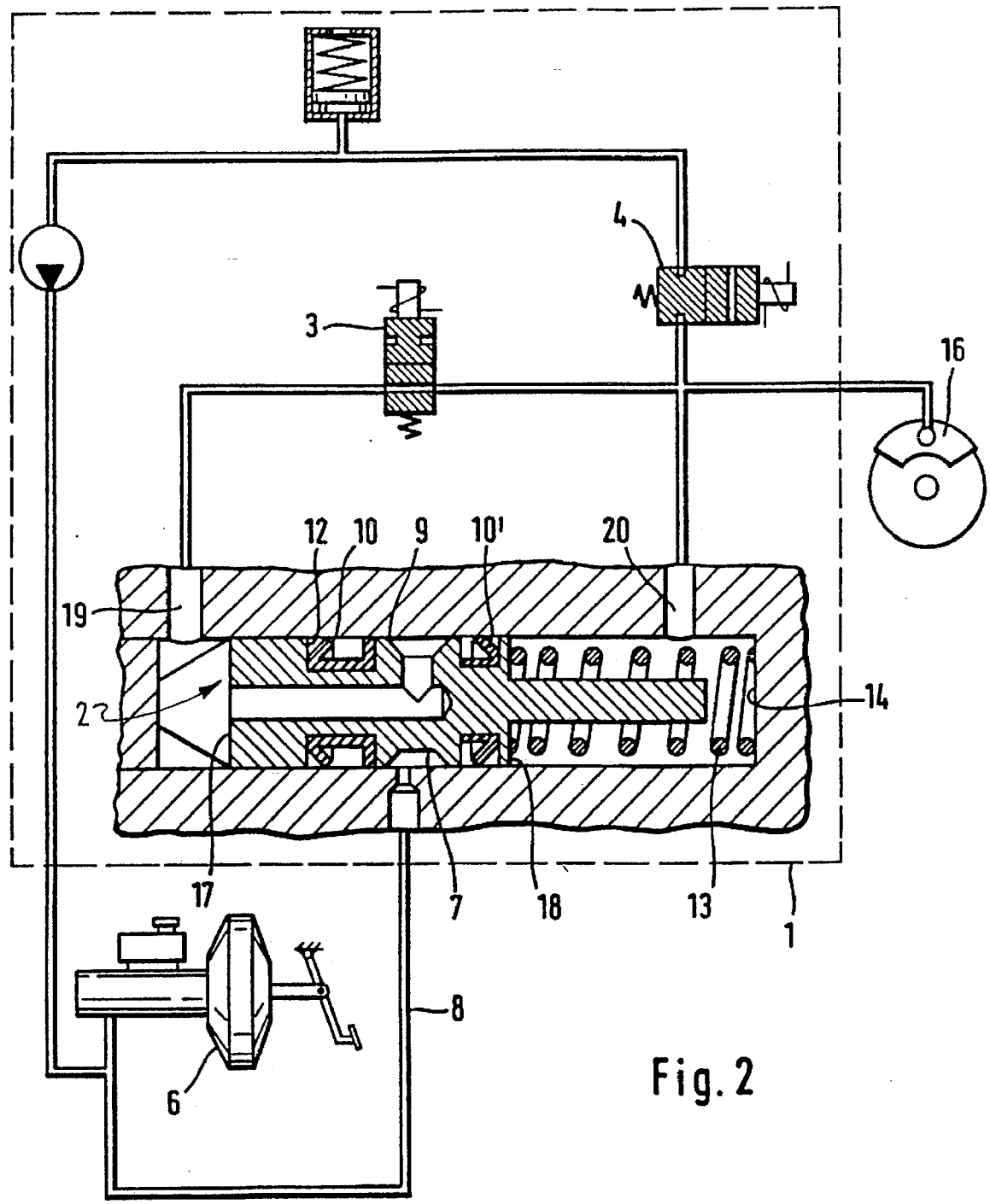
FIG. 2 Shows another form of embodiment of the slide valve.

FIG. 2 shows a slide valve 2 differing in design and operation from the one of FIG. 1 and accommodating another gasket 10' arranged to the right of the circular groove 7. Slide valve 2 includes the control edge 9 and the gasket 10'. The slide valve 2 in response to the pressure difference between the pressure fluid source (master cylinder 6) and the pressure fluid consumer (wheel brake) 16 (by circumventing the inlet valve 3) enables a direct return flow of pressure fluid from the wheel brake 16 toward the master cylinder 6. This provides for the advantage that the check valve arranged according to FIG. 1 in parallel to the inlet valve 3 can be integrated into the slide valve 2 as a cup-type sealant in a simple and space-saving way.

Figure 3:
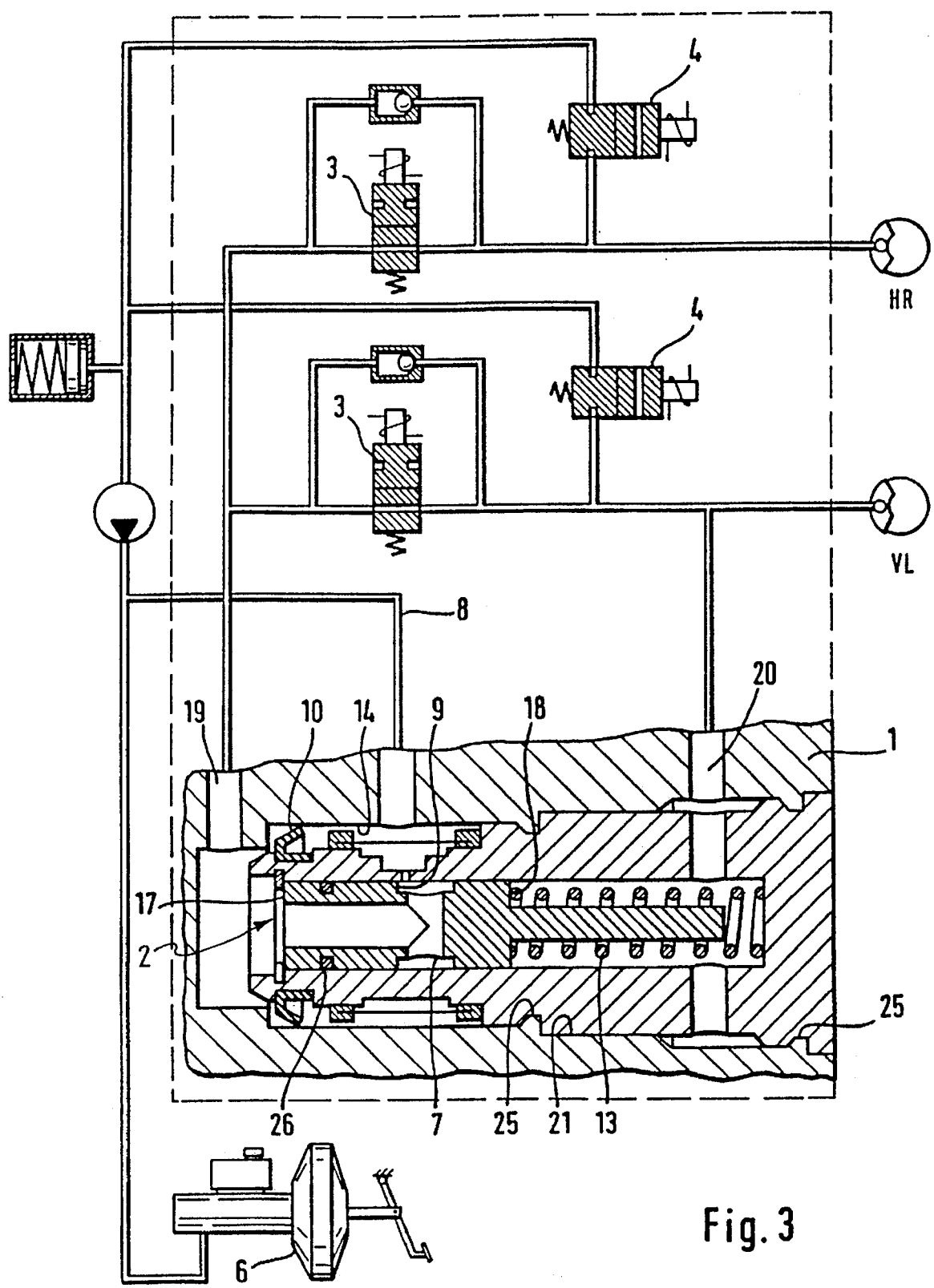
FIG. 3 Shows a slide valve integrated into a guiding sleeve.

FIG. 3 shows another example of embodiment of a slide valve 2 arranged within a guiding sleeve 21. The guiding sleeve 21 is caulked into the accommodating bore 14 of the valve-receiving body 1 designed as a stepped bore, and is provided with a gasket 10 acting as a check valve precluding a leakage flow (short-circuit flow) from the pressure fluid source (master cylinder) 6 toward the in-flow to the inlet valve 3. If the slide valve 2 (as a result of the pressure difference between the lefthand and right-hand front faces 17,18) is in a right-hand position regulating the pressure fluid flow from the master cylinder 6 to the inlet valve 3 (for the purpose of a rapid pressure decrease within the wheel brake 16) the slide valve 2 can be circumvented in that the pressure fluid volume prevailing on the wheel brake 16 (through the gasket 10 acting as a check valve) by decreasing the pressure in the master cylinder 6.

The hydraulic switch connection of the slide valve 2 for the brake circuit diagonal as shown, substantially corresponds to the embodiment as shown in FIGS. 1 and 2, with the slide piston capable of being fitted with the gasket suggested according to FIGS. 1 and 2 or with gaskets of a varied contour of the type as shown by the Figure, in which an O-ring 26 is provided.

The use of a slide valve 2 arranged in a guiding sleeve 21 provides the advantage that serviceability can be checked externally of the brake pressure control and the accommodating bore 14 within the valve receiving body 1 can be fashioned with a seat that is relatively easy to produce. A multiplicity of known per se sealing variants are permitted for the guiding sleeve 21 in the valve receiving body 1, among which the sealing by means of an automatically shearing connection being regarded as particularly feasible. For that purpose, the guiding sleeve 21 comprises a shaft tapering toward the blind bore and the shaft is preferably provided with recesses 25, with the shaft inserted into the relatively softer material volume of the valve receiving body 1 in a pressure fluid-tight and firm way within recesses 25. Recesses 25 are preferably annularly distributed circumferentially along the guiding sleeve 21, with an annular chamber being at the same time formed between the recesses 25 (to establish the connection between the pressure fluid channel 20 following the inlet valve 3) and the front face 18 to which pressure is applied by the compression spring 13.

Figure 4:
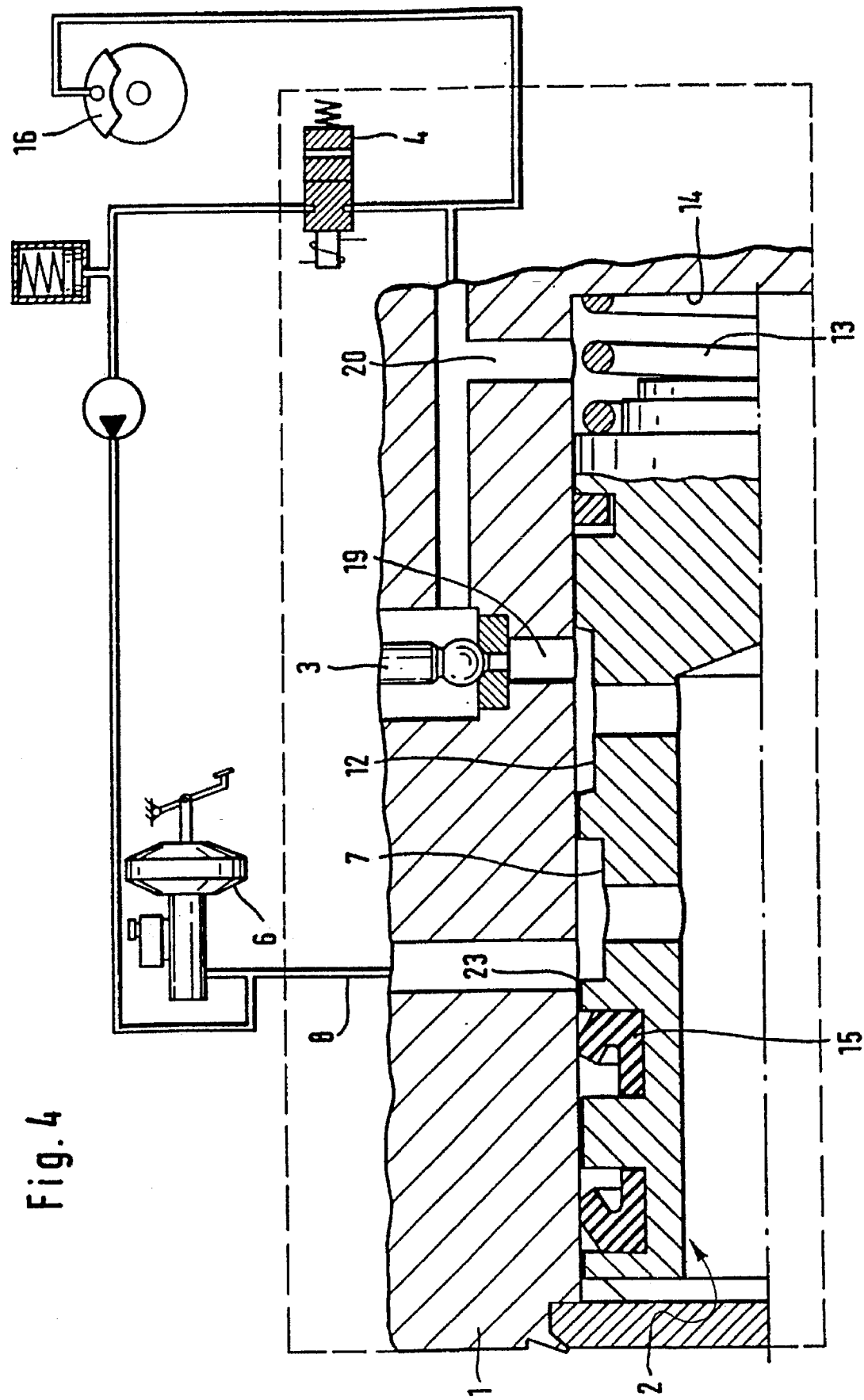
FIG. 4 Shows a slide valve with a prerestrictor step and a corresponding sealing arrangement.

FIG. 4 shows another advantageous embodiment for sealing a slide valve 2 directly inserted into the accommodating bore 14 of the valve-receiving body 1. The sealing of the slide valve 2 as shown is suitable for dividing the passaway requiring a hydraulic connection of the pressure fluid source (master cylinder) 6 to the feed-in channel of the inlet valve 3 via two circular grooves 7, 12 arranged on the slide valve 2, so that in deviation from the pressure fluid connections on the slide valve 2 as described in FIGS. 1 to 3, the two pressure fluid channels 19, 20 respectively leading to the inlet valve 3 terminate in structural juxtaposition with and in parallel to the receiving bore 14 while the feed-in channel 8 of the master cylinder (pressure fluid source) 6 is arranged structurally externally of and in series connection with the pressure fluid passageways 19, 20.

The sealing of the slide valve 2 as shown comprises a gasket 15, for example, of cup-type configuration which in the direction of actuation of the slide valve 2 is operatively connected and, hence, arranged to the left next to the first circular groove 7 corresponding to the feed-in channel 8. During closing of the inlet valve 3 and initiating the pressure decrease within the wheel brake 16 by opening the outlet valve 4, the slide valve 2 (as a result of the pressure difference) moves in counter-direction of the compression spring 13 to the right. The gasket 15 due to the shoulder on the first circular groove acting as a prerestrictor step 23 overlapping with the feed-in channel 8 in pressure-balanced condition closes the feed-in channel 8 without being exposed to the risk of a hydraulic differential pressure which could potentially destroy the gasket by forcing it into the feed-in channel 8 in a destroying way. As long as the inlet valve 3 is closed for the purpose of decreasing the pressure within the wheel brake 16, the hydraulically activated slide valve 2 remains in its right-hand stop position separating the master cylinder from the inlet valve 3, with no leakage flow being able to develop on the gasket 15. This precludes a pressure increase ahead of the inlet valve 3 and avoids undesired noise when reopening the inlet valve 3. As soon as the inlet valve 3 opens, the slide valve 2 moves, again, under the action of the compression spring 13 again toward its resting position, with the prerestrictor step 23 provided on the first annular groove 15 ensuring a sufficient pressure decrease between the back of the gasket 15 and the pressure prevailing in the area of the inlet valve 3 to preclude a differential pressure-responsive penetration of the sealing lip into the feed-in channel 8.

We claim:

1. A brake pressure regulator, comprising:
 a valve-receiving body including two pressure fluid channels and a feed-in channel,
 a hydraulically actuable slide valve integrated into a receiving bore within the valve receiving body, said slide valve including having first and second front faces terminating on said pressure fluid channels of said valve receiving body,
 wherein said slide valve includes a circular groove having a control edge, wherein said circular groove, through said feed-in channel terminates in the receiving bore wherein the receiving bore includes at least one gasket which in a hydraulically actuated position of the slide valve locks the hydraulic connection between the feed-in channel and at least one of the pressure fluid channels.

2. A brake pressure control according to claim 1, wherein at least first and second gaskets are provided which are arranged on both sides of the circular groove on the slide valve.

3. A brake pressure control according to claim 2 further comprising a second annular groove formed on said slide valve, said second gasket is disposed in said second annular groove on the slide valve.

4. A brake pressure control according to claim 1, wherein at least one gasket is fixed to an outer circumference of a guiding sleeve accommodating the slide valve.

5. A brake pressure control according to claim 1, further including at least one gasket disposed within the receiving bore and fixed to a guiding sleeve.

6. A brake pressure control according to claim 5, further including a circular groove provided between the guiding sleeve and the receiving bore.

7. A brake pressure control according to claim 5, wherein the receiving bore is designed as an externally expanded stepped bore placed in engagement with the cylindrical surface of the guiding sleeve in a form-locking way.

8. A brake pressure control according to claim 1, wherein the circular groove and a sealing element sealing the slide valve against the receiving bore is a prerestrictor step establishing on both sides of the sealing element a pressure balance once the scaling element is in overlapping relationship with the feed-in channel of a pressure fluid source.

9. A brake pressure control according to claim 8, wherein the prerestrictor step provided on the first circular groove comprises a defined circular gap formed between a shoulder on the slide valve and an accommodating bore.

10. A brake pressure control according to claim 8, wherein the sealing element is configured as a sealing cup exerting a blocking effect between the feed-in channel and one of said pressure fluid channels.

* * * * *